US011192469B2

(12) United States Patent
Gandhi et al.

(10) Patent No.: US 11,192,469 B2
(45) Date of Patent: Dec. 7, 2021

(54) VEHICLE SEAT WITH MORPHING BOLSTERS

(71) Applicant: Toyota Motor Engineering & Manufacturing North America, Inc., Plano, TX (US)

(72) Inventors: Umesh N. Gandhi, Farmington Hills, MI (US); Brian J. Pinkelman, Ann Arbor, MI (US); Ryohei Tsuruta, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 485 days.

(21) Appl. No.: 16/262,113

(22) Filed: Jan. 30, 2019

(65) Prior Publication Data

US 2020/0238854 A1    Jul. 30, 2020

(51) Int. Cl.
*B60R 22/00* (2006.01)
*B60N 2/02* (2006.01)
*B60N 2/90* (2018.01)

(52) U.S. Cl.
CPC ........... *B60N 2/0244* (2013.01); *B60N 2/914* (2018.02); *B60N 2/99* (2018.02); *B60N 2002/026* (2013.01)

(58) Field of Classification Search
CPC ........ B60N 2/0244; B60N 2/99; B60N 2/914; B60N 2002/026; B60R 22/00
(Continued)

(56) References Cited

U.S. PATENT DOCUMENTS

| 4,286,910 A | 9/1981 | Conrad |
| 4,319,427 A | 3/1982 | Way, Jr. |

(Continued)

FOREIGN PATENT DOCUMENTS

| CN | 108819806 A | 11/2018 |
| EP | 1904337 B1 | 10/2010 |

(Continued)

OTHER PUBLICATIONS

U.S. Appl. No. 16/367,457, filed Mar. 28, 2019.
(Continued)

*Primary Examiner* — Shardul D Patel
(74) *Attorney, Agent, or Firm* — Christopher G. Darrow; Darrow Mustafa PC

(57) ABSTRACT

A vehicle seat can be configured to selectively provide support to a vehicle occupant in conditions when lateral acceleration is experienced. An actuator can be located within the vehicle seat. When activated, the actuator cause a portion of the seat to morph into an activated configuration. The actuator can be activated based on vehicle speed, steering angle, and/or lateral acceleration. The actuator can include a bladder containing a dielectric fluid. A first and second conductor can be operatively positioned on opposite portions of the bladder. When electrical energy is supplied to the first and second conductors, they can have opposite charges. As a result, the first and second conductors can be electrostatically attracted toward each other to cause at least a portion of the dielectric fluid to be displaced to an outer peripheral region of the bladder, which bulges as a result and increases an overall height of the actuator.

20 Claims, 6 Drawing Sheets

(58) Field of Classification Search
USPC .......................................................... 701/49
See application file for complete search history.

(56) References Cited

U.S. PATENT DOCUMENTS

| | | | |
|---|---|---|---|
| 4,726,656 | A | 2/1988 | Schofield et al. |
| 4,848,179 | A | 7/1989 | Ubhayakar |
| 4,958,100 | A | 9/1990 | Crawley et al. |
| 4,964,062 | A | 10/1990 | Ubhayakar et al. |
| 5,021,798 | A | 6/1991 | Ubhayakar |
| 5,065,978 | A | 11/1991 | Albarda et al. |
| 5,222,668 | A | 6/1993 | Frankeny et al. |
| 5,502,345 | A | 3/1996 | Kahn et al. |
| 5,536,062 | A | 7/1996 | Spears |
| 5,668,432 | A | 9/1997 | Tominaga et al. |
| 6,120,002 | A | 9/2000 | Biegelsen et al. |
| 6,215,221 | B1 | 4/2001 | Cabuz et al. |
| 6,490,960 | B1 | 12/2002 | Jackson et al. |
| 6,702,301 | B1 | 3/2004 | Davies et al. |
| 6,830,071 | B2 | 12/2004 | Ku et al. |
| 6,939,291 | B2 | 9/2005 | Jay |
| 7,125,077 | B2 | 10/2006 | Frank |
| 7,353,747 | B2 | 4/2008 | Swayze et al. |
| 7,484,735 | B2 | 2/2009 | Verbrugge et al. |
| 7,521,840 | B2 | 4/2009 | Heim |
| 7,575,807 | B1 | 8/2009 | Barvosa-Carter et al. |
| 7,594,697 | B2 * | 9/2009 | Browne ................ A47C 7/38 |
| | | | 297/216.12 |
| 7,755,840 | B2 | 7/2010 | Batchko et al. |
| 7,892,630 | B1 | 2/2011 | McKnight et al. |
| 7,901,524 | B1 | 3/2011 | McKnight et al. |
| 7,905,538 | B2 | 3/2011 | Ukpai et al. |
| 7,909,403 | B2 * | 3/2011 | Lawall .................. B60N 2/986 |
| | | | 297/284.9 |
| 8,136,875 | B2 * | 3/2012 | Laake ................... B60N 2/753 |
| | | | 297/188.14 |
| 8,231,563 | B2 | 7/2012 | Mauge et al. |
| 8,240,677 | B2 | 8/2012 | Browne et al. |
| 8,430,810 | B2 | 4/2013 | Hassidov et al. |
| 8,863,608 | B2 | 10/2014 | Fischer et al. |
| 9,061,118 | B2 | 6/2015 | Shoham et al. |
| 9,308,949 | B1 | 4/2016 | Mihelic et al. |
| 9,580,115 | B2 * | 2/2017 | Haller .................. B60N 2/501 |
| 9,764,113 | B2 | 9/2017 | Tuval et al. |
| 9,790,968 | B2 | 10/2017 | Fang et al. |
| 9,919,418 | B2 | 3/2018 | Hashimoto |
| 9,937,966 | B1 | 4/2018 | Yoon et al. |
| 9,970,564 | B2 * | 5/2018 | Dankbaar .............. F16K 3/316 |
| 10,058,647 | B2 | 8/2018 | Roche et al. |
| 10,293,718 | B1 | 5/2019 | Ilievski et al. |
| 10,302,586 | B2 | 5/2019 | Sun et al. |
| 10,465,723 | B2 | 11/2019 | Tlievski et al. |
| 10,532,672 | B1 | 1/2020 | Pinkelman et al. |
| 10,631,083 | B1 | 4/2020 | Gandhi et al. |
| 10,640,033 | B1 | 5/2020 | Gandhi et al. |
| 10,682,903 | B1 | 6/2020 | Gandhi et al. |
| 10,682,931 | B2 | 6/2020 | Rowe et al. |
| 10,746,206 | B1 | 8/2020 | Rowe et al. |
| 10,749,448 | B2 | 8/2020 | Lindsay et al. |
| 10,797,217 | B2 | 10/2020 | Hakkens et al. |
| 10,946,535 | B2 | 3/2021 | Gandhi et al. |
| 2002/0100888 | A1 | 8/2002 | Sharma et al. |
| 2004/0107829 | A1 | 6/2004 | Davis et al. |
| 2004/0261411 | A1 | 12/2004 | MacGregor |
| 2005/0045480 | A1 | 3/2005 | Krumme |
| 2005/0198904 | A1 | 9/2005 | Browne et al. |
| 2005/0206096 | A1 | 9/2005 | Browne et al. |
| 2006/0032715 | A1 * | 2/2006 | Barvosa-Carter ...... B61G 11/12 |
| | | | 188/267 |
| 2006/0038745 | A1 | 2/2006 | Naksen et al. |
| 2007/0046074 | A1 | 3/2007 | Satta et al. |
| 2007/0120438 | A1 | 5/2007 | Divoux |
| 2007/0246898 | A1 | 10/2007 | Keefe et al. |
| 2009/0086331 | A1 | 4/2009 | Gunasekaran et al. |
| 2009/0115285 | A1 | 5/2009 | Najafi et al. |
| 2009/0255187 | A1 | 10/2009 | Alexander et al. |
| 2010/0090497 | A1 | 4/2010 | Beckon |
| 2010/0258362 | A1 | 10/2010 | Trimmer |
| 2011/0188258 | A1 | 8/2011 | Tajima |
| 2012/0287493 | A1 | 11/2012 | Kuhlman et al. |
| 2013/0255815 | A1 | 10/2013 | Brinkmann et al. |
| 2013/0304049 | A1 | 11/2013 | Behnke, II et al. |
| 2014/0109560 | A1 | 4/2014 | Tlievski et al. |
| 2015/0197173 | A1 * | 7/2015 | Hulway ................ B60N 2/646 |
| | | | 297/284.9 |
| 2015/0331156 | A1 | 11/2015 | Hirsa |
| 2016/0106620 | A1 | 4/2016 | Uno et al. |
| 2017/0036709 | A1 | 2/2017 | Metka et al. |
| 2017/0080987 | A1 | 3/2017 | Morgan |
| 2017/0150252 | A1 | 5/2017 | Trestain et al. |
| 2017/0240224 | A1 | 8/2017 | Gaylard et al. |
| 2017/0252260 | A1 | 9/2017 | Gummin et al. |
| 2018/0036198 | A1 | 2/2018 | Mergl et al. |
| 2018/0172172 | A1 | 6/2018 | Oehler et al. |
| 2018/0339624 | A1 | 11/2018 | Leek |
| 2019/0023161 | A1 | 1/2019 | Sullivan et al. |
| 2019/0032684 | A1 | 1/2019 | Kowalewski et al. |
| 2019/0059608 | A1 | 2/2019 | Yan et al. |
| 2019/0232822 | A1 | 8/2019 | Hintermaier |
| 2019/0296217 | A1 | 9/2019 | Jung et al. |
| 2019/0312193 | A1 | 10/2019 | Pelssers et al. |
| 2019/0322324 | A1 | 10/2019 | Hurst |
| 2019/0326505 | A1 | 10/2019 | Pelssers et al. |
| 2020/0032822 | A1 | 1/2020 | Keplinger et al. |
| 2020/0066963 | A1 | 2/2020 | Johnson et al. |
| 2020/0130202 | A1 | 4/2020 | Gandhi et al. |
| 2020/0130321 | A1 | 4/2020 | Gandhi et al. |
| 2020/0132213 | A1 | 4/2020 | Gandhi et al. |
| 2020/0132223 | A1 | 4/2020 | Prokhorov et al. |
| 2020/0136525 | A1 | 4/2020 | Gandhi et al. |
| 2020/0136526 | A1 | 4/2020 | Gandhi et al. |
| 2020/0156237 | A1 | 5/2020 | Tang et al. |
| 2020/0156314 | A1 | 5/2020 | Rowe et al. |
| 2020/0182269 | A1 | 6/2020 | Rowe |
| 2020/0189469 | A1 | 6/2020 | Gandhi et al. |
| 2020/0216121 | A1 | 7/2020 | Gandhi et al. |
| 2020/0223325 | A1 | 7/2020 | Pinkelman et al. |
| 2020/0247274 | A1 | 8/2020 | Gandhi et al. |
| 2020/0259426 | A1 | 8/2020 | Rowe |
| 2020/0282878 | A1 | 9/2020 | Gandhi et al. |
| 2020/0298732 | A1 | 9/2020 | Gandhi et al. |

FOREIGN PATENT DOCUMENTS

| | | |
|---|---|---|
| JP | H07303381 A | 11/1995 |
| JP | 2007097292 A | 4/2007 |
| JP | 2010142275 A | 7/2010 |
| KR | 20050056526 A | 6/2005 |
| KR | 101395364 B1 | 5/2014 |
| WO | 2017077541 A1 | 5/2017 |
| WO | 2018175741 A1 | 9/2018 |

OTHER PUBLICATIONS

Knoss, "Next-gen flexible robots move and heal like us," CU Boulder Today, Jan. 4, 2018, retrieved from the Internet: <https://www.colorado.edu/today/2018/01/04/next-gen-flexible-robots-move-and-heal-us>, [retrieved Mar. 30, 2018] (6 pages).

Yang et al., "Novel Design and Three-Dimensional Printing of Variable Stiffness Robotic Grippers," Dec. 2016, ASME Journal of Mechanisms and Robotics, vol. 8, p. 061010-1 to 061010-15 (15 pages).

SMC Tech, "Precision Regulator: Series IR1000/2000/3000", SMC Tech, pp. 713-725 and 1-19, 2015 (53 pages).

Acome et al., "Hydraulically Amplified Self-Healing Electrostatic Actuators with Muscle-Like Performance," Science, vol. 359, Issue 6371, pp. 61-65 (Jan. 5, 2018) (6 pages).

\* cited by examiner

VEHICLE SEAT WITH MORPHING BOLSTERS

FIELD

The subject matter herein relates in general to vehicles and, more particularly, to vehicle seats.

BACKGROUND

While a vehicle is in use, there are various forces that act upon the vehicle and its occupants. For instance, when the vehicle turns right or left, particularly at relatively high speeds, lateral acceleration may make a vehicle occupant feel like he or she is being pushed sideways in the opposite direction of the turn. A deep seat and stiff bolster and seat cushion can help reduce these effects.

SUMMARY

In one respect, the subject matter described herein is directed to a vehicle seat system. The system can include a vehicle seat. The system can include one or more actuators located within the vehicle seat. The one or more actuators can be operatively positioned such that, when activated, the one or more actuators cause a portion of the seat to morph into an activated configuration. The one or more actuators can include a bladder. The bladder can include a flexible casing. The bladder can define a fluid chamber. The fluid chamber can include a dielectric fluid. The one or more actuators can include a first conductor and a second conductor operatively positioned on opposite portions of the bladder. The one or more actuators can be configured such that, when electrical energy is supplied to the first conductor and the second conductor, the first conductor and the second conductor have opposite charges. As a result, the first conductor and the second conductor can be electrostatically attracted toward each other to cause at least a portion of the dielectric fluid to be displaced to an outer peripheral region of the fluid chamber. The outer peripheral region can bulge, which can result in an increase in the overall height of the one or more actuators.

In another respect, the subject matter described herein is directed to a method of morphing a portion of a vehicle seat. One or more actuators can be located within the vehicle seat. The one or more actuators can be operatively positioned such that, when activated, the one or more actuators cause a portion of the seat to morph into an activated configuration. The one or more actuators can include a bladder. The bladder can include a flexible casing. The bladder can define a fluid chamber. The fluid chamber can include a dielectric fluid. The one or more actuators can include a first conductor and a second conductor operatively positioned on opposite portions of the bladder. The one or more actuators can be configured such that, when electrical energy is supplied to the first conductor and the second conductor, the first conductor and the second conductor have opposite charges. As a result, the first conductor and the second conductor can be electrostatically attracted toward each other to cause at least a portion of the dielectric fluid to be displaced to an outer peripheral region of the fluid chamber. The outer peripheral region can bulge, which can result in an increase in the overall height of the one or more actuators. The method can include determining, based on the sensor data acquired by one or more sensors, whether a seat actuator activation condition is met. The method can include, responsive to determining that the seat actuator activation condition is met, causing one or more actuators to be activated to cause a portion of the vehicle seat to morph into an activated configuration.

DETAILED DESCRIPTION

Figure 1:
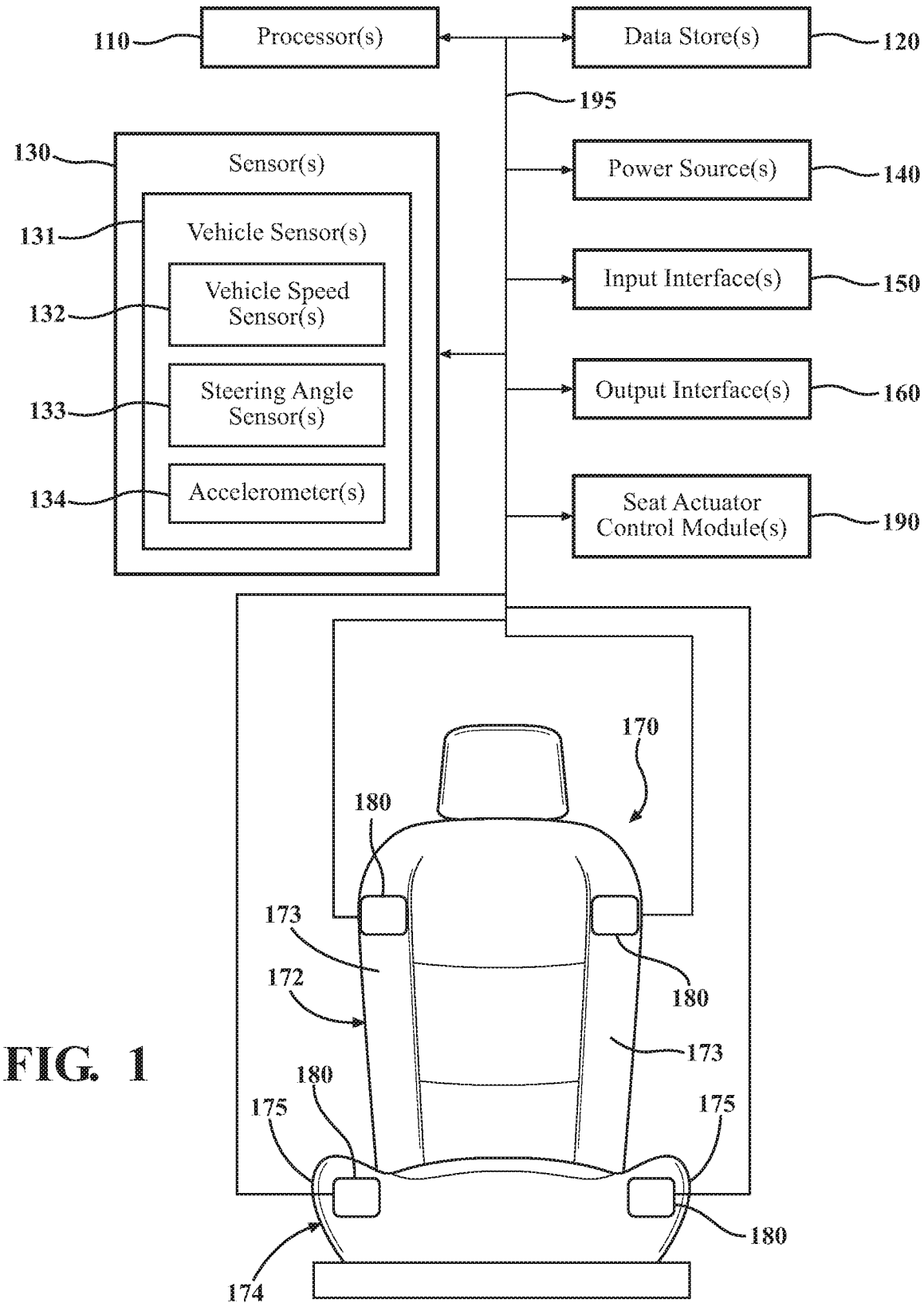
FIG. 1 is an example of a vehicle.

While deep seats and stiff bolsters and seat cushions can help reduce the effects of lateral acceleration, such features may add to discomfort of a passenger during normal driving conditions in which larger lateral acceleration forces are not experienced by vehicle occupants. Accordingly, arrangements described here are directed to vehicle seats configured to selectively provide lateral support to a vehicle occupant in conditions when higher lateral acceleration is experienced. To that end, one or more seat actuators located within the vehicle seat. The one or more actuators can be operatively positioned such that, when activated, the one or more actuators cause a portion of the seat to morph into an activated configuration.

The one or more actuators can be any suitable type of actuator. For instance, the one or more actuators can include a bladder containing a dielectric fluid. A first conductor and a second conductor can be operatively positioned on opposite portions of the bladder. The one or more actuators can be configured such that, when electrical energy is supplied to the first conductor and the second conductor, the first conductor and the second conductor have opposite charges. As a result, the first conductor and the second conductor can be electrostatically attracted toward each other to cause at least a portion of the dielectric fluid to be displaced to an outer peripheral region of the fluid chamber, which can result in an increase in the overall height of the one or more actuators.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, a portion of a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle may be a watercraft, an aircraft or any other form of motorized transport.

The vehicle 100 can have an autonomous operational mode and/or a semi-autonomous operational mode. For instance, the vehicle 100 can have an autonomous operational mode in which or more computing systems are used to navigate and/or maneuver the vehicle along a travel route with no input or supervision required from a human driver. The vehicle 100 can have one or more semi-autonomous operational modes in which a portion of the navigation and/or maneuvering of the vehicle along a travel route is performed by one or more computing systems, and a portion of the navigation and/or maneuvering of the vehicle along a travel route is performed by a human driver. The vehicle 100 can have a manual operational mode in which all of or a majority of the navigation and/or maneuvering of the vehicle is performed by a human driver. In one or more arrangements, the vehicle 100 can be a conventional vehicle that is configured to operate in only a manual mode.

The vehicle 100 can include various elements. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements may be shown as being located on or within the vehicle 100 in FIG. 1, it will be understood that one or more of these elements can be located external to the vehicle 100. Thus, such elements are not located on, within, or otherwise carried by the vehicle 100. Further, the elements shown may be physically separated by large distances. Indeed, one or more of the elements can be located remote from the vehicle 100.

The vehicle 100 can include one or more processors 110, one or more data stores 120, one or more sensors 130, one or more power sources 140, one or more input interfaces 150, one or more output interfaces 160, one or more seats 170, one or more seat actuators 180, and one or more seat actuator control modules 190. Each of these elements will be described in turn below.

As noted above, the vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, one or more processors 110 can be a main processor(s) of the vehicle 100. For instance, one or more processors 110 can be electronic control unit(s) (ECU).

The vehicle 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

The vehicle 100 can include one or more sensors 130. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the vehicle 100 includes a plurality of sensors 130, the sensors can work independently from each other. Alternatively, two or more of the sensors can work in combination with each other. In such case, the two or more sensors can form a sensor network. The sensor(s) 130 can be operatively connected to the processor(s) 110, the data store(s) 120, and/or other elements of the vehicle 100 (including any of the elements shown in FIG. 1).

The sensor(s) 130 can include any suitable type of sensor. Various examples of different types of sensors will be described herein. However, it will be understood that the embodiments are not limited to the particular sensors described.

The sensor(s) 130 can include one or more vehicle sensors 131. The vehicle sensor(s) 131 can detect, determine, assess, monitor, measure, quantify and/or sense information about the vehicle 100 itself (e.g., position, orientation, speed, etc.). In one or more arrangements, the vehicle sensors 131 can include one or more vehicle speed sensors 132, one or more steering angle sensors 133, and/or one or more accelerometers 134. The vehicle speed sensors 132 can be any sensor configured to detect, determine, assess, monitor, measure, quantify and/or sense the speed of a vehicle, now known or later developed. The steering angle sensors 133, can be any sensor configured to detect, determine, assess, monitor, measure, quantify and/or sense the steering wheel position angle and/or rate of turn, now known or later developed. The accelerometers 134 can include any sensor, now know or later developed, configured to detect, determine, assess, monitor, measure, quantify and/or sense any information or data about acceleration forces experience by a vehicle or occupants of the vehicle. The accelerometers 124 can be configured to detect, determine, assess, monitor, measure, quantify and/or sense any information or data about lateral acceleration forces.

Alternatively or in addition, the sensor(s) 130 can include one or more environment sensors configured to detect, determine, assess, monitor, measure, quantify, acquire, and/or sense driving environment data. "Driving environment data" includes and data or information about the external environment in which a vehicle is located or one or more portions thereof. In one or more arrangements, the environment sensors can include one or more cameras, one or more radar sensors, one or more lidar sensors, one or more sonar sensors, and/or one or more ranging sensors.

As noted above, the vehicle 100 can include one or more power sources 140. The power source(s) 140 can be any power source capable of and/or configured to energize the seat actuator(s) 180. For example, the power source(s) 140 can include one or more batteries, one or more fuel cells, one or more generators, one or more alternators, one or more solar cells, and combinations thereof. In some arrangements, the power source(s) 140 can be configured to supply positively charged electrical energy and/or negatively charged electrical energy.

The vehicle 100 can include one or more input interfaces 150. An "input interface" includes any device, component, system, element or arrangement or groups thereof that enable information/data to be entered into a machine. The input interface(s) 150 can receive an input from a vehicle occupant (e.g. a driver or a passenger). Any suitable input interface 150 can be used, including, for example, a keypad, display, touch screen, multi-touch screen, button, joystick, mouse, trackball, microphone and/or combinations thereof.

The vehicle 100 can include one or more output interfaces 160. An "output interface" includes any device, component, system, element or arrangement or groups thereof that enable information/data to be presented to a vehicle occupant (e.g. a person, a vehicle occupant, etc.). The output interface(s) 160 can present information/data to a vehicle occupant. The output interface(s) 160 can include a display. Alternatively or in addition, the output interface(s) 160 may include an earphone and/or speaker. Some components of the vehicle 100 may serve as both a component of the input interface(s) 150 and a component of the output interface(s) 160.

The vehicle 100 can include one or more seats 170. The seat(s) 170 can be for any vehicle occupants, such for a driver or for a passenger. The seat(s) 170 can be any type of vehicle seat, now known or later developed. The one or more seats 170 can have any suitable configuration. For instance, the one or more seats 170 can include a back portion 172 and a cushion portion 174. The back portion 172 and/or the cushion portion 174 can include bolsters 173, 175, respectively.

In one or more arrangements, one or more portions of the seat(s) 170 can be configured to counteract lateral acceleration forces experienced by a vehicle occupant. To that end, the vehicle 100 can include one or more seat actuators 180. The seat actuator(s) 180 can be operatively connected to one or more of the seats 170. In one or more arrangements, the seat actuator(s) 180 can be located within a portion of the seat 170. For instance, the seat actuators(s) 180 can be located within the back portion 172 of the seat(s) 170 and/or within the cushion portion 174 of the seat(s) 170. More particularly, the seat actuator(s) 180 can be located within a bolster of the back portion 172 and/or a bolster of the cushion portion 174.

The seat actuator(s) 180 can be operatively positioned relative to one or more surfaces or portions of the seat(s) 170. The surfaces can be a surface of the back portion 172, the cushion portion 174, a bolster of the back portion 172, and/or a bolster of the cushion portion 174. When actuated, the seat actuator(s) 180 can cause the surfaces or portions of the seat 170 to morph into a different configuration.

The seat actuators 180 can be any element or combination of elements operable to modify, adjust and/or alter one or more surfaces or portions of the vehicle seat(s) 170. The seat actuators 180 may activate responsive to receiving signals or other inputs from the processor(s) 110 and/or the seat actuator control module(s) 190. The processor(s) 110 and/or the seat actuator control module(s) 190 can be operatively connected to the seat actuators 180. In FIG. 1, the seat actuator(s) 180 are generally represented by a rectangular feature. It will be understood that any suitable actuator can be used. The seat actuator(s) 180 will be described in greater detail below in connection with FIGS. 2-3.

It should be noted that the seat actuator(s) 180 can be operatively positioned so that portions of the vehicle seat 170 can be morphed in a plurality of directions. Thus, one or more seat actuators 180 can be configured to morph a first portion of the seat in a first direction, and one or more actuators 180 can be configured to morph a second portion of the seat 170 in a second direction. In some instances, the first portion and the second portion can be the same. In other instances, the first portion and the second portion can be different.

The vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data stores 120 may contain such instructions.

The vehicle 100 can include one or more modules. In one or more arrangements, the modules described herein can include artificial or computational intelligence elements, e.g., neural network, fuzzy logic or other machine learning algorithms. Further, in one or more arrangements, the modules can be distributed among a plurality of modules. In one or more arrangements, two or more of the modules described herein can be combined into a single module.

The vehicle 100 can include one or more seat actuator control modules 190. The seat actuator control module(s) 190 can include profiles and logic for actively controlling the seat actuator(s) 180 according to arrangements herein. The seat actuator control module(s) 190 can be configured to determine when the seat actuator(s) 180 should be activated or deactivated. The seat actuator control module(s) 190 can be configured to do so in any suitable manner. For instance, the seat actuator control module(s) 190 can be configured to analyze data or information acquired by the sensor(s) 130 (e.g., the vehicle speed sensor(s) 132, the steering angle sensor(s) 133, and/or the accelerometers 134). Alternatively or additionally, the seat actuator control module(s) 190 can be configured to detect user inputs (e.g., commands) provided on the input interface(s) 150. The seat actuator control module(s) 190 can retrieve raw data from the sensor(s) 130 and/or from the data store(s) 120. The seat actuator control module(s) 190 can use profiles, parameters, or setting loaded into the seat actuator control module(s) 190 and/or stored in the data store(s) 120.

The seat actuator control module(s) 190 can analyze the sensor data to determine an appropriate action for the seat(s) 170. The seat actuator control module(s) 190 can be configured to cause one or more actuators 180 to be activated or deactivated. As used herein, "cause" or "causing" means to make, force, compel, direct, command, instruct, and/or enable an event or action to occur or at least be in a state where such event or action may occur, either in a direct or indirect manner. For instance, the seat actuator control module(s) 190 can selectively permit or prevent the flow of electrical energy from the power source(s) 140 to the seat actuator(s) 180. The seat actuator control module(s) 190 can be configured send control signals or commands over a communication network 195 to the seat actuator(s) 180.

The seat actuator control module(s) 190 can be configured to cause the seat actuator(s) 180 to be selectively activated or deactivated based on one or more activation parameters. For instance, the seat actuator control module(s) 190 can be configured to compare one or more detected activation characteristics to one or more activation thresholds. If the threshold is met, then the seat actuator control module(s) 190 can cause the seat actuator(s) 180 to be activated or maintained in an activated condition. If the threshold is not met, then the seat actuator control module(s) 190 can cause the seat actuator(s) 180 to be deactivated or maintained in a deactivated or non-activated state.

For instance, there can be a vehicle speed threshold. In one or more arrangements, the vehicle speed threshold can be about 30 miles per hour (mph), 35 mph, 40 mph, 45 mph, 50 mph, 55 mph, 60 mph, 65 mph, 70 mph, or even greater, just to name a few possibilities. If a detected vehicle speed is above the vehicle speed threshold, the seat actuator control module(s) 190 can be configured to cause the seat actuator(s) 180 to be activated or maintained in an activated state. If a detected vehicle speed is below the vehicle speed threshold, the seat actuator control module(s) 190 can be configured to cause the seat actuator(s) 180 to be deactivated or maintained in a deactivated state.

As another example, there can be a steering angle threshold. In one or more arrangements, the steering angle threshold can be about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, about 80 degrees, about 85 degrees, or about 90 degrees, just to name a few possibilities. If a detected steering angle is above the steering angle threshold, the seat actuator control module(s) 190 can be configured to cause the seat actuator(s) 180 to be activated or maintained in an activated state. If a detected steering angle is below the vehicle speed threshold, the seat actuator control module(s) 190 can be configured to cause the seat actuator(s) 180 to be deactivated or maintained in a deactivated state.

In one or more arrangements, the seat actuator control module(s) 190 can be configured to cause the seat actuator(s) 180 to be selectively activated or deactivated based on both a vehicle sped threshold and a steering angle threshold. Thus, if a detected vehicle speed is above the vehicle speed threshold and if a detected steering angle is above the steering angle threshold, the seat actuator control module(s) 190 can be configured to cause the seat actuator(s) 180 to be activated or maintained in an activated state. If a detected vehicle speed is below the vehicle speed threshold and/or if a detected steering angle is below the steering angle threshold, the seat actuator control module(s) 190 can be configured to cause the seat actuator(s) 180 to be deactivated or maintained in a deactivated state.

As another example, there can be an acceleration threshold, such as a lateral acceleration threshold. Thus, if a detected or determined lateral acceleration of the vehicle is above the lateral acceleration threshold, the seat actuator control module(s) 190 can be configured to cause the seat actuator(s) 180 to be activated or maintained in an activated state. If a detected steering angle is below the lateral acceleration threshold, the seat actuator control module(s) 190 can be configured to cause the seat actuator(s) 180 to be deactivated or maintained in a deactivated state.

In some instances, the seat actuator control module(s) 190 can be configured to cause the seat actuator(s) 180 to be selectively activated or deactivated based on user inputs (e.g., commands). For instance, a user can provide an input on the input interface(s) 150. The input can be to activate or deactivate the seat actuator(s) 180. The seat actuator control module(s) 190 can be configured to cause the seat actuator(s) 180 to be deactivated or activated in accordance with the user input.

The seat actuator control module(s) 190 can be configured to control a plurality of seats 170. The seat actuator control module(s) 190 can be configured to control each seat 170 individually. Thus the control of one seat 170 is independent of the control of the other seats 170. Alternatively, the seat actuator control module(s) 190 can be configured to control the plurality of seat(s) 170 collectively. Thus, each seat 170 can be activated or deactivated at substantially the same time, to the same degree of actuations, and/or in substantially the same manner.

It should be noted that the seat actuator control module(s) 190 can be configured to determine the direction is which lateral acceleration will occur. Thus, if the seat actuator control module(s) 190 determines that the direction of lateral acceleration will be to the right, the seat actuator control module(s) 190 can activate the seat actuator(s) 180 on the opposite side (i.e., left side) of the seat 170. Similarly, if the seat actuator control module(s) 190 determines that the direction of lateral acceleration will be to the left, the seat actuator control module(s) 190 can activate the seat actuator(s) 180 on the opposite (i.e., right) side of the seat 170.

The various elements of the vehicle 100 can be communicatively linked to one another or one or more other elements through one or more communication networks 195. As used herein, the term "communicatively linked" can include direct or indirect connections through a communication channel, bus, pathway or another component or system. A "communication network" means one or more components designed to transmit and/or receive information from one source to another. The data store(s) 120 and/or one or more other elements of the vehicle 100 can include and/or execute suitable communication software, which enables the various elements to communicate with each other through the communication network and perform the functions disclosed herein.

The one or more communication networks 195 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

Figure 2A:
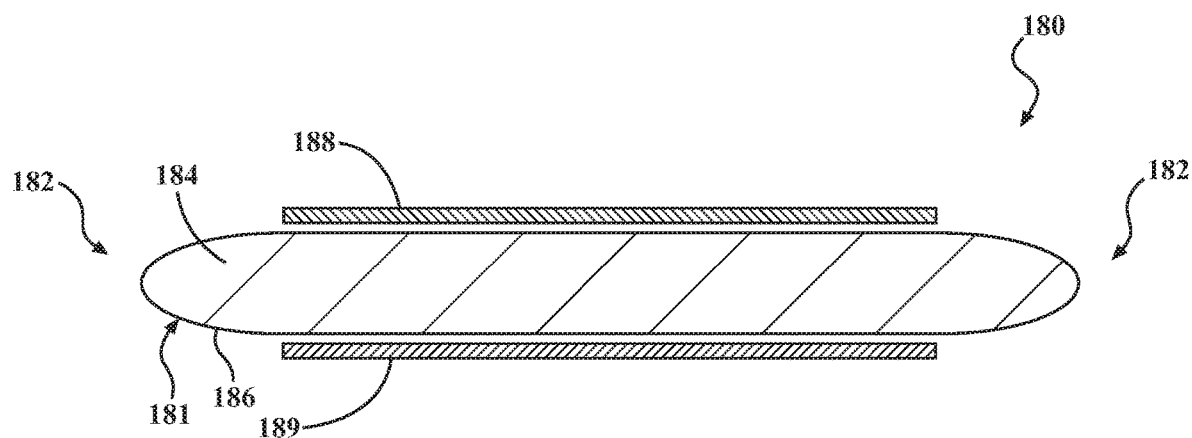
FIG. 2A is an example of a portion of a vehicle seat, showing a bolster in a non-activated configuration.
Figure 2B:
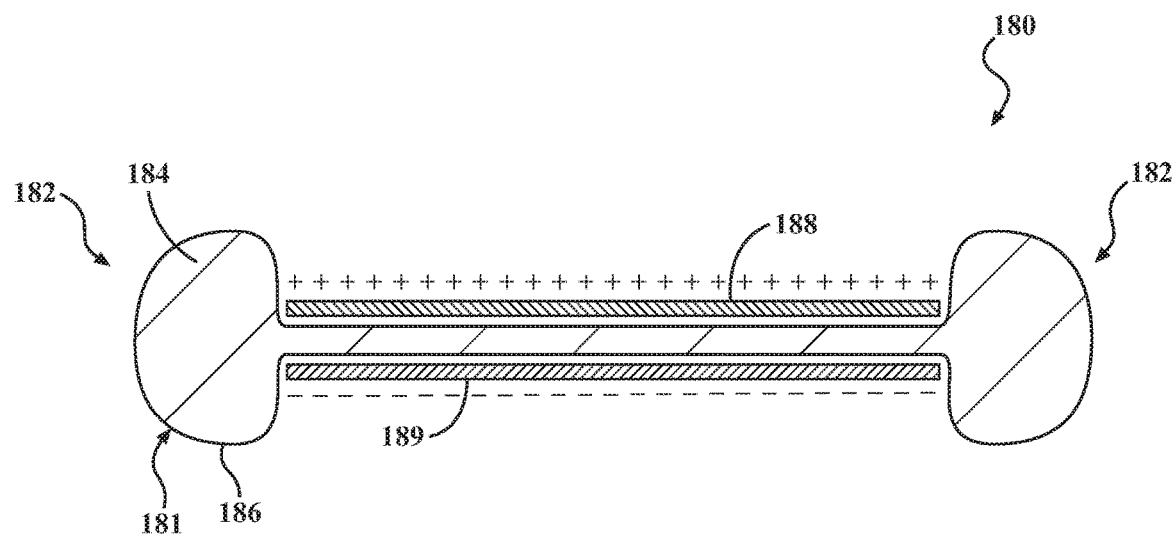
FIG. 2B is an example of the portion of the vehicle seat, showing the bolster in an activated configuration.

Referring to FIGS. 2A-2B, a cross-sectional view of one example of the seat actuator 180 is shown. The seat actuator 180 can have a body that is, at least in large part, made of a soft, flexible material. The seat actuator 180 can include a bladder 181 containing a dielectric fluid 184. The bladder 181 can include a casing 330. The casing 186 can be made of a single piece of material, or a plurality of separate pieces of material that are joined together. An inner surface of the casing 186 can define a fluid chamber. In one or more arrangements, the bladder 181 and/or fluid chamber can be fluid impermeable.

The bladder 181 can be made of any suitable material. For example, the bladder 181 can be made of an insulating material. The insulating material can be flexible. The insulating material can be a polymer and/or an elastomeric polymer (elastomer). The polymers or elastomers can be natural or synthetic in nature. In one or more arrangements, the insulating material can be silicone rubber. Additional examples of the insulating material include nitrile, ethylene propylene diene monomer (EPDM), fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof.

A dielectric fluid 184 can be any suitable material. In one or more arrangements, the dielectric fluid 184 can be ethylene glycol. As an additional example, the dielectric fluid 184 can include transformer oil or mineral oil. In one or more arrangements, the dielectric fluid 184 can be a lipid based fluid, such as a vegetable oil-based dielectric fluid.

The dielectric fluid 184 can have various associated properties. The dielectric fluid 184 can have an associated dielectric constant. In one embodiment, the dielectric fluid 184 can have a dielectric constant of 1 or greater, 2 or greater, 3 or greater, 4 or greater, 5 or greater, 6 or greater, 7 or greater, 8 or greater, 9 or greater, 10 or greater, 20 or greater, 30 or greater, 40 or greater, 50 or greater, or higher.

In one or more arrangements, the dielectric fluid 184 can be a fluid that is resistant to electrical breakdown. In one or more arrangements, the dielectric fluid 184, can provide electrical insulating properties. In one or more arrangements, the dielectric fluid 184 can provide electrical insulating properties. In one or more arrangements, the dielectric fluid 184 can prevent arcing between surrounding conductors.

The seat actuator 180 can include a plurality of conductors. In the example shown in FIGS. 2A-2B, the seat actuator 180 can include a first conductor 188 and a second conductor 189. The conductors 188, 189 can conduct electrical energy. The conductors 188, 189 can be made of any suitable material, such as a conductive elastomer. In one or more arrangements, the conductors 188, 189 can be made of natural rubber with carbon or other conductive particles distributed throughout the material. The conductors 188, 189 can be made of the same material as each other, or the conductors 188, 189 can be made of different materials. One or more of the conductors 188, 189 can be formed by a single, continuous structure, or one or more of the conductors 188, 189 can be formed by a plurality of separate structures.

The first conductor 188 and the second conductor 189 can be located on opposite sides or portions of the bladder 181. Thus, the first conductor 188 and the second conductor 189 can be separated by the bladder 181. The first conductor 188 and/or the second conductor 189 can be operatively connected to the bladder 181 in any suitable manner. In some instances, the first conductor 188 and/or the second conductor 189 can be embedded within a wall of the bladder 181. In one or more arrangements, the first conductor 188 can be operatively positioned between the bladder 181 and an insulating material. In such case, the first conductor 188 can be substantially encapsulated by the bladder 181 and the insulating material. Also, the second conductor 189 can be operatively positioned between the bladder 181 and an insulating material. In one or more arrangements, the second conductor 189 can be substantially encapsulated by the bladder 181 and the insulating material. In one or more arrangements, the insulating material can be made of an insulating elastomer. Thus, it will be appreciated that, at least in some instances, the insulating material can define exterior surfaces of the seat actuator 180.

Each of the conductors 188, 189 can be operatively connected to receive electrical energy from a power source (e.g., the power source(s) 140). As a result, electrical energy can be selectively supplied to each individual conductors 188, 189.

The seat actuator 180 can have a non-activated mode and an activated mode. Each of these modes will be described in turn. FIG. 2A shows an example of a non-activated mode of the seat actuator 180. In such case, electrical energy is not supplied to the first conductor 188 and the second conductor 189. Thus, the first conductor 188 and the second conductor 189 can be spaced apart from each other. The bladder 181 can be in a neutral state. In some instances, a portion of the bladder 181 can extend beyond the outer edges of the first conductor 188 and the second conductor 189.

FIG. 2B shows an example of an activated mode of the seat actuator 180. In the actuated mode, power can be supplied to the first conductor 188 and the second conductor 189. In one implementation, the first conductor 188 can become positively charged and the second conductor 189 can become negatively charged. Thus, the first conductor 188 and the second conductor 189 can be oppositely charged. As a result, the first conductor 188 and the second conductor 189 can be attracted toward each other. The attraction between the first conductor 188 and the second conductor 189 can cause them and the respective portions of the bladder 181 to move toward each other. As a result, at least a portion of the dielectric fluid 184 within the fluid chamber can be squeezed toward the outer peripheral region(s) 182 of the bladder 181. In at least some instances, the outer peripheral region(s) 182 of the bladder 181 can bulge, as is shown in FIG. 3B. As the result, the outer peripheral region(s) 182 of the bladder 181 may increase the overall height of the seat actuator 180 (in the top to bottom direction on the page).

Figure 3A:
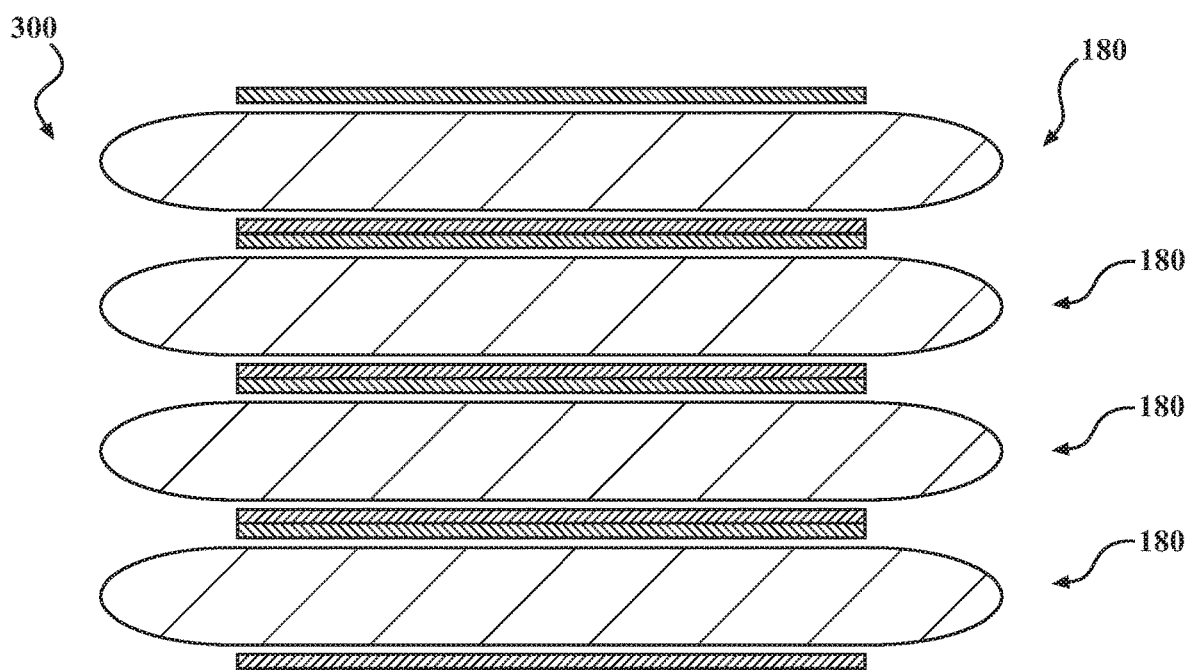
FIG. 3A depicts an example of a seat actuator, showing a non-activated condition.
Figure 3B:
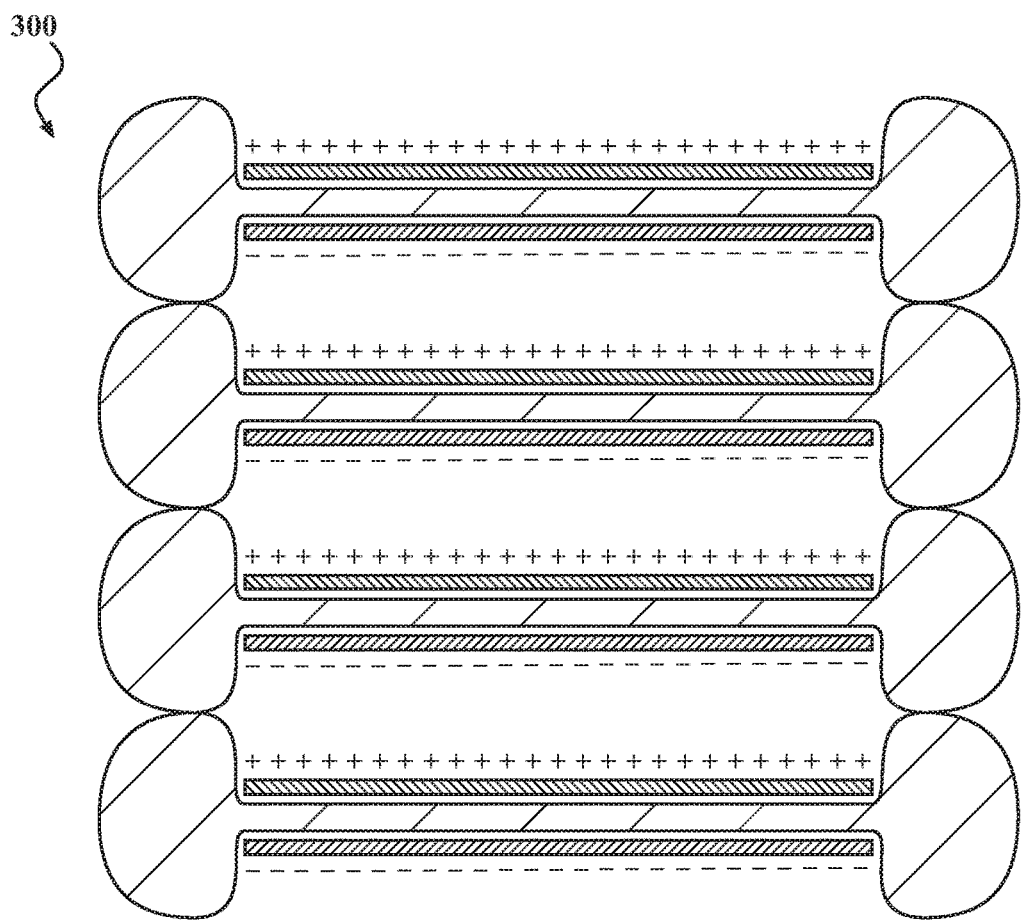
FIG. 3B depicts an example of the seat actuator, showing an activated condition.

Turning now to FIGS. 3A-3B, an example of a plurality of seat actuators 180 arranged in an actuator stack 300 is shown. FIG. 3A shows the actuator stack 300 in a non-actuated mode. FIG. 4B shows the actuator stack 400 in an actuated mode. The above-description of the seat actuator 180 in connection with FIGS. 2A-2B applies equally to the individual actuators 180 in the actuator stack 300. It will be appreciated that, in going from the non-actuated mode to the actuated mode, the overall height (the top to bottom direction on the page) of the actuator stack 300 can increase. In such arrangements, it will be appreciated that the seat actuators 180 in the actuator stack 300 can be actuated individually or two or more of the seat actuators 180 can be actuated at the same time. Neighboring actuators 180 in the actuator stack 300 can be separated from each other by an insulating layer. In some instances, such an insulating layer can operatively connect the neighboring actuators 180 together.

In one or more arrangements, an individual actuator 180 or an actuator stack 300 can be enclosed within a casing. The casing can provide protection to the actuators(s) 180 and to the seat 170. The casing can be made of a flexible material that can accommodate the seat actuator(s) 180 when activated and deactivated.

Figure 4A:
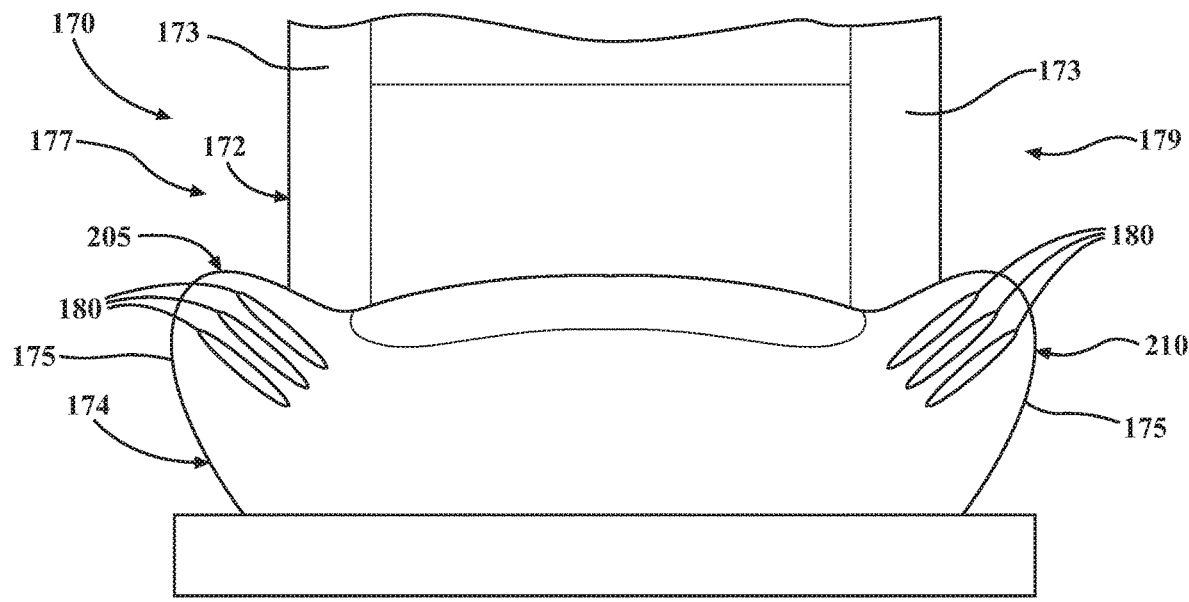
FIG. 4A depicts an example of a plurality of seat actuators arranged in a stack, showing a non-activated condition.
Figure 4B:
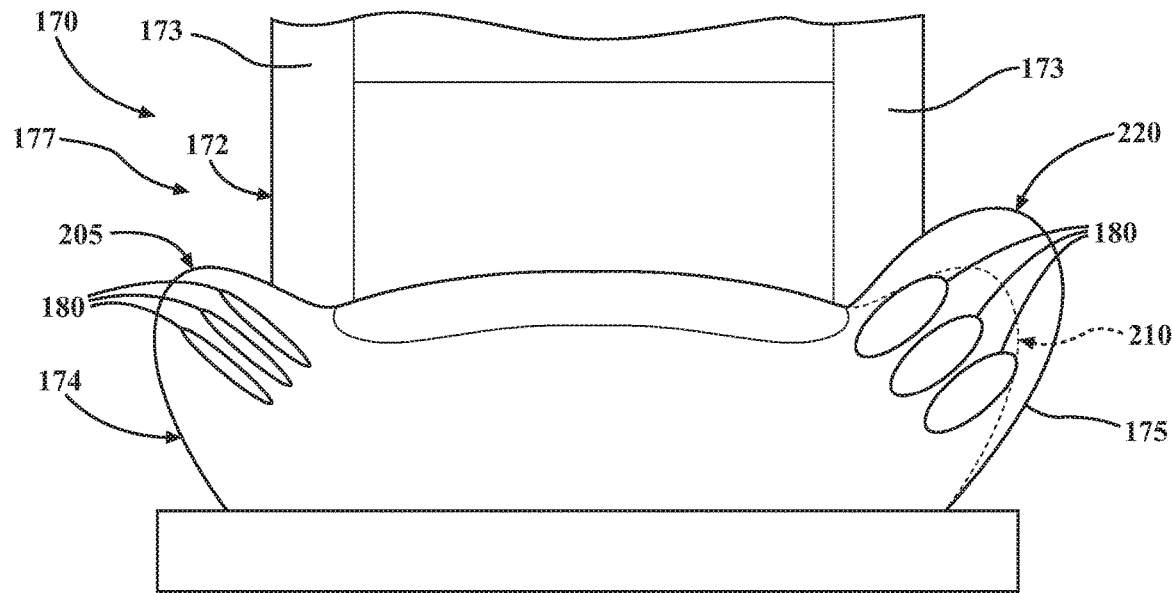
FIG. 4B depicts an example of the plurality of seat actuators arranged in a stack, showing an activated condition.

Referring to FIGS. 4A-4B, an example of a portion of a vehicle seat is shown. For purposes of this example, the seat actuator(s) 180 will be described in connection with the cushion portion 174 of the vehicle seat 170, but it will be understood that this description applies equally to the seat actuator(s) 180 in connection with the back portion 172 of the vehicle seat 170. Further, the seat actuator(s) 180 are represented generally in FIGS. 4A and 4B for purposes of clarity.

The seat actuator(s) 180 can be operatively positioned within the vehicle seat 170 relative to one or more surfaces or portions of the seat(s) 170. The surfaces can be a surface of the back portion 172, the cushion portion 174, the bolster 173 of the back portion 172, the bolster 175 of the cushion portion 174, and/or a headrest. When actuated, the seat actuator(s) 180 can cause the surfaces or portions of the seat to morph into a different configuration. In the arrangements shown herein, it should be noted that the seat actuator 180 can be a single actuator, a single stack of a plurality of actuators, a plurality of actuators, a plurality of stacks of actuators, and/or combinations thereof.

FIG. 4A shows an example of the seat actuator(s) 180 in a non-activated condition or a deactivated condition. In this example, there can be a plurality of actuators 180 in the bolster 175 on both a first side 177 and a second side 179 of the seat 170. The bolster 175 on the first side 177 can have a non-activated configuration 205, and the bolster 175 on the second side 179 can have a non-activated configuration 210. The non-activated configurations 205, 210 can be substantially mirror images of each other.

FIG. 4B shows an example of the seat actuators 180 on the first side 177 remaining in the non-activated condition or a deactivated condition; however, the seat actuators 180 on the second side 179 are in an activated condition. As a result, the bolster 175 on the second side 179 can have an activated configuration 220. As shown in FIG. 4B, the overall size of the bolster 175 on the second side 179 has become enlarged overall. It will be appreciated that the bolster 175 in the activated configuration 220 can provide additional resistance to lateral acceleration of a vehicle occupant in that direction, such as when a vehicle is turning.

Now that the various potential systems, devices, elements and/or components of the vehicle 100 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 5:
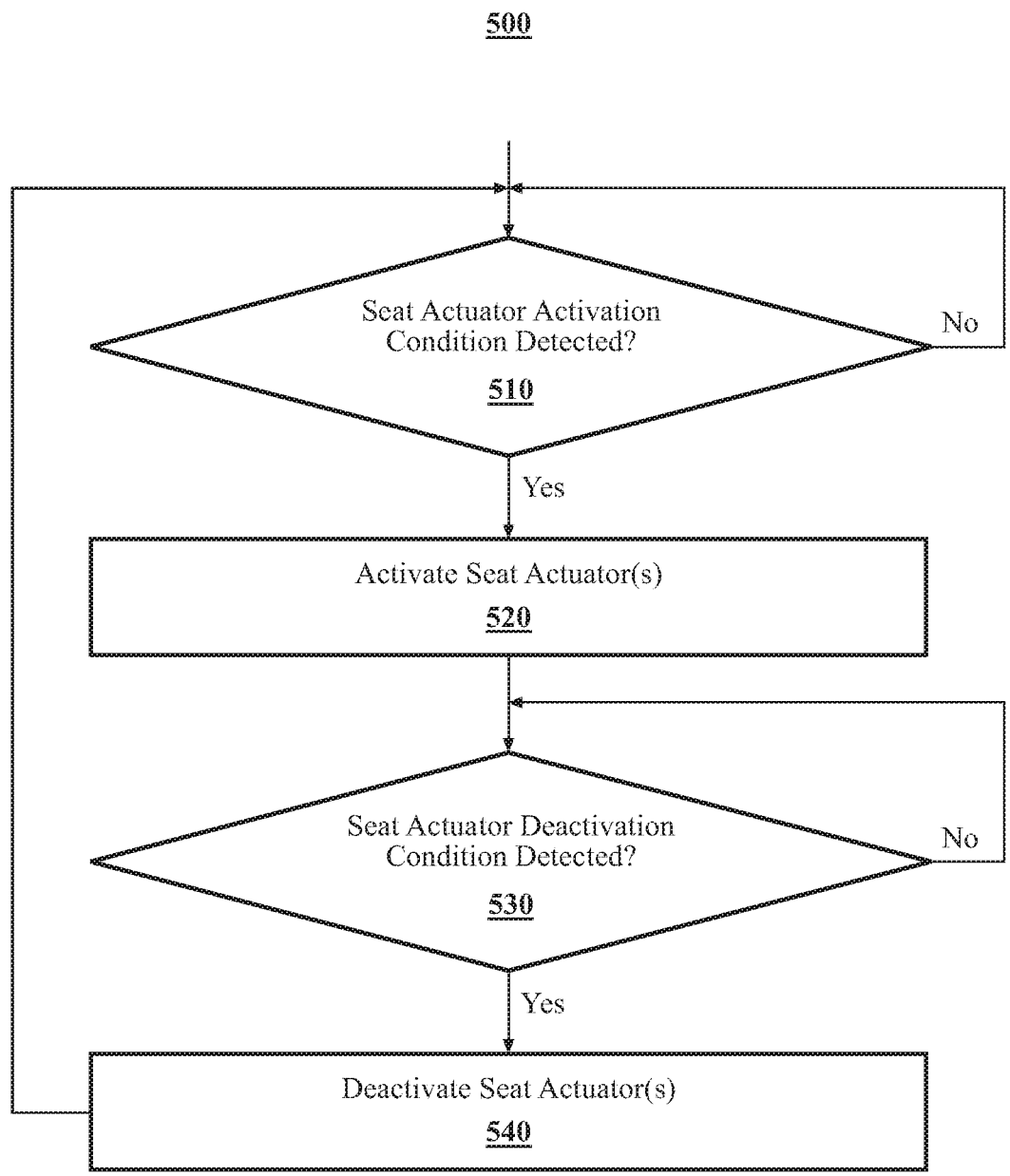
FIG. 5 is an example of a method of selectively morphing a portion of a vehicle seat.

Turning to FIG. 5, an example of a method 500 is shown. For the sake of discussion, the method 500 can begin with the seat actuator(s) 180 in a non-activated mode, such as is shown in FIG. 4A. In the non-activated mode, electrical energy from the power source(s) 140 is not supplied to the seat actuator(s) 180. At block 510, it can be determined whether a seat activation condition has been detected. The seat activation condition may be detected by the seat actuator control module(s) 190, the processor(s) 110, and/or one or more sensor(s) 130. For instance, the seat actuator control module(s) 190, the processor(s) 110, and/or one or more sensor(s) 130 can determine that data acquired by the vehicle sensor(s) 131 meets a seat activation condition. For instance, the seat actuator control module(s) 190, the processor(s) 110, and/or one or more sensor(s) 130 can determine whether the current vehicle speed and/or the current steering angle meet respective seat activation threshold. Alternatively or additionally, the seat actuator control module(s) 190, the processor(s) 110, and/or one or more sensor(s) 130 can determine whether the current lateral acceleration meets respective seat activation threshold. Alternatively or in addition, the seat actuator control module(s) 190, the processor(s) 110, and/or one or more sensor(s) 130 can detect a user input indicating that the interface should be activated. The user input can be provided via the input interface(s) 150.

If a seat activation condition is not detected, the method 500 can end, return to block 510, or proceed to some other block. However, if a seat activation condition is detected, then the method can proceed to block 520. At block 520, the seat actuator(s) 180 can be activated. Of course, the seat actuator control module(s) 190 and/or the processor(s) 110 may only actuate certain individual seat actuator(s) 180 while leaving others in a non-activated state. Thus, the seat actuator control module(s) 190 and/or the processor(s) 110 can cause or allow the flow of electrical energy from the power sources(s) 140 to the seat actuator(s) 180.

As a result, the first conductor 188 and the second conductor 189 can become oppositely charged, which causes them to attract each other. When activated, the seat actuator(s) 180 can morph to an activated shape, such as is shown in FIG. 2B or 3B. The seat actuator(s) 180 can interact with portions of the vehicle seat 170 to cause a portion of the vehicle seat 170 to morph into an activated configuration, such as is shown in FIG. 4B. The method can continue to block 530.

At block 530, it can be determined whether a seat deactivation condition has been detected. The seat deactivation condition may be detected by the seat actuator control module(s) 190, such as based on data acquired by the sensor(s) 130 and/or by detecting a user input or the cessation of a user input. If a seat deactivation condition is not detected, the method 500 can return to block 530, or proceed to some other block. However, if a deactivation condition is detected, then the method can proceed to block 540. At block 540, the seat actuator(s) 180 can be deactivated. Thus, the seat actuator control module(s) 190 and/or the processor(s) 110 can cause the flow of electrical energy from the power sources(s) 140 to the seat actuator(s) 180 to be discontinued.

The method 500 can end. Alternatively, the method 500 can return to block 510 or some other block.

Figure 6A:
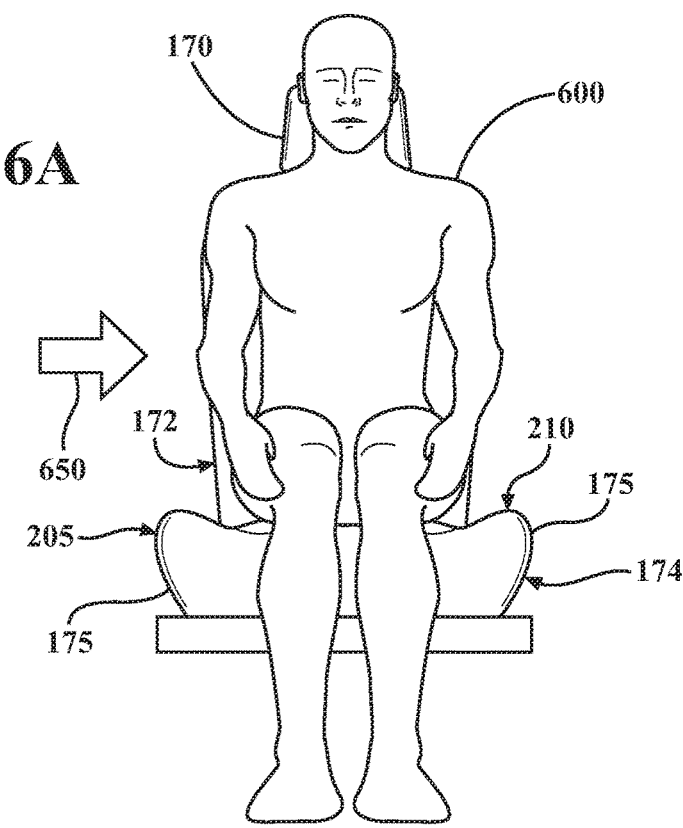
FIG. 6A shows an example of an occupant in a vehicle seat when the seat actuators are in a non-activated configuration.
Figure 6B:
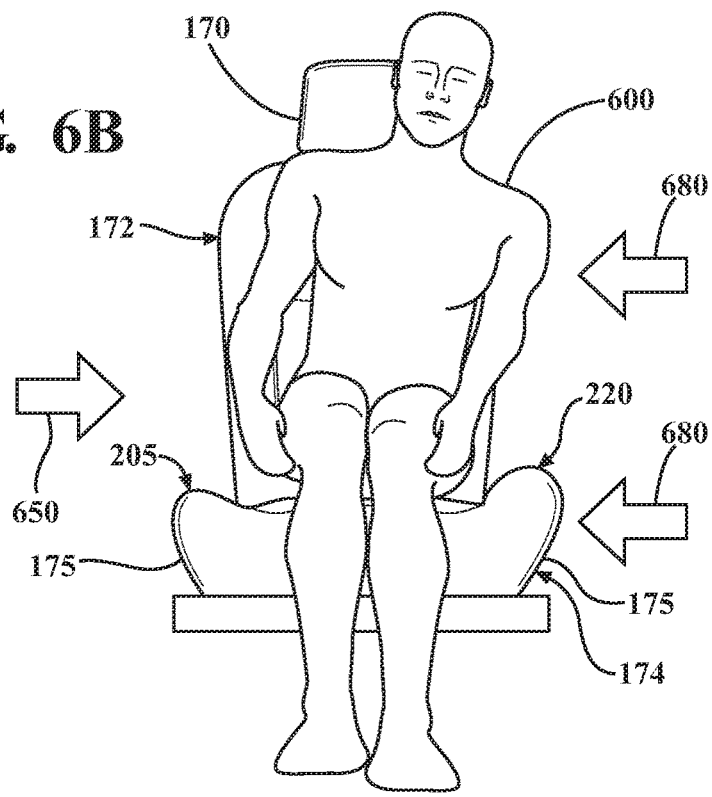
FIG. 6B shows an example of the occupant in the vehicle seat when the seat actuators are in the activated configuration.

A non-limiting example of the operation of the arrangements described herein will now be presented in connection to FIGS. 6A-6B. These figures show an occupant 600 in the vehicle seat 170. The vehicle seat 170 can include the seat actuators 180, though the seat actuators 180 are not shown in FIGS. 6A-6B. FIG. 6A shows an example of an occupant in a vehicle seat when the seat actuators are in a non-activated configuration. As the vehicle makes a right turn, particularly at higher speeds, lateral acceleration forces 650 can act upon the vehicle and/or occupant 600. As a result, the occupant 600 may actually be or may feel like he or she is being pushed, moved, and/or forced at least to the left due to such forces.

Accordingly, the seat actuators 180 on the left side of the vehicle seat 170 (such as in the can be activated can be moved to the right toward the right lateral side 104 of the vehicle 100. FIG. 6B shows an example of the occupant in the vehicle seat when the seat actuators are in the activated configuration. As can be seen the bolster 175 of the cushion portion 174 can become enlarged as a result of the actuation of the seat actuators 180 in such location. Similarly, though not visible in FIG. 6B, the bolster 173 of the back portion 172 can become enlarged as a result of the actuation of the seat actuators 180. The activated configuration for the bolsters 173, 175 can provide lateral support 680 to the occupant 600, which can help to reduce the effects experienced by the occupant 600 due to the lateral acceleration forces 650.

It will be appreciated that arrangements described herein can provide numerous benefits, including one or more of the benefits mentioned herein. For example, arrangements described herein can provide lateral support for a vehicle occupant in conditions in which high lateral acceleration forces are experienced by the occupant. Arrangements described herein can also allow a vehicle seat to be selectively morphed. Thus, the vehicle seat can be in a normal configuration in most driving conditions and morphed when needed, thereby increasing occupant comfort. Arrangements described herein can avoid the use of large and complicated gears and actuators, thereby enabling more compact designs and packaging. Arrangements described here can provide for more efficient use of power.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g., AB, AC, BC or ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle seat system comprising:
a vehicle seat; and
one or more actuators located within the vehicle seat, the one or more actuators being operatively positioned such that, when activated, the one or more actuators cause a portion of the vehicle seat to morph into an activated configuration, the one or more actuators including:
a bladder, the bladder including a flexible casing and defining a fluid chamber, the fluid chamber including a dielectric fluid; and
a first conductor and a second conductor operatively positioned on opposite portions of the bladder,
the one or more actuators being configured such that, when electrical energy is supplied to the first conductor and the second conductor, the first conductor and the second conductor have opposite charges, whereby the first conductor and the second conductor are electrostatically attracted toward each other to cause at least a portion of the dielectric fluid to be displaced to an outer peripheral region of the fluid chamber, whereby an overall height of the one or more actuators increases.

2. The vehicle seat system of claim 1, wherein the portion of the vehicle seat is a bolster of a seat cushion.

3. The vehicle seat system of claim 1, wherein the portion of the vehicle seat is a bolster of a seat back.

4. The vehicle seat system of claim 1, wherein the portion of the vehicle seat is a seat back or a seat cushion.

5. The vehicle seat system of claim 1, further including:
one or more power sources operatively connected to the one or more actuators; and
one or more processors operatively connected to control a supply of electrical energy from the one or more power sources to the one or more actuators.

6. The vehicle seat system of claim 5, wherein the one or more processors are programmed to initiate executable operations comprising:
determining, based on sensor data acquired by one or more sensors, whether a seat actuator activation condition is met; and
responsive to determining that the seat actuator activation condition is met, causing electrical energy to be supplied to one or more of the one or more actuators from the one or more power sources, whereby the one or more of the one or more actuators are activated to cause the portion of the vehicle seat to morph into an activated configuration.

7. The vehicle seat system of claim 6, wherein the executable operations further include:
determining, based on sensor data acquired by one or more sensors, whether a seat actuator deactivation condition is met; and
responsive to determining that the seat actuator deactivation condition is met, causing the supply of electrical energy to one or more of the one or more actuators from the one or more power sources to be discontinued, whereby the one or more of the one or more actuators are deactivated to cause the portion of the vehicle seat to substantially return to a non-activated configuration.

8. The vehicle seat system of claim 6, further including one or more sensors operatively connected to the one or more processors, wherein the one or more sensors are configured to acquire sensor data about vehicle speed or steering wheel angle, and wherein the seat actuator activation condition is a vehicle speed threshold or a steering angle threshold.

9. The vehicle seat system of claim 6, further including one or more sensors operatively connected to the one or more processors, wherein the one or more sensors are configured to acquire sensor data about lateral acceleration, and wherein the seat actuator activation condition is a lateral acceleration threshold.

10. The vehicle seat system of claim 5, further including:
an input interface operatively connected to the one or more processors, wherein the one or more actuators are selectively activated or deactivated responsive to a user input provided on the input interface.

11. The vehicle seat system of claim 1, wherein the one or more actuators is a plurality of actuators.

12. The vehicle seat system of claim 11, wherein the plurality of actuators are arranged in a stack.

13. A method of morphing a portion of a vehicle seat, one or more actuators being located within the vehicle seat, the one or more actuators being operatively positioned such that, when activated, the one or more actuators cause a portion of the vehicle seat to morph into an activated configuration, the method comprising:
determining, based on sensor data acquired by one or more sensors, whether a seat actuator activation condition is met; and
responsive to determining that the seat actuator activation condition is met, causing one or more actuators to be activated to cause a portion of the vehicle seat to morph into an activated configuration, the one or more actuators including:

a bladder, the bladder including a flexible casing and defining a fluid chamber, the fluid chamber including a dielectric fluid; and a first conductor and a second conductor operatively positioned on opposite portions of the bladder, the one or more actuators being configured such that, when electrical energy is supplied to the first conductor and the second conductor, the first conductor and the second conductor have opposite charges, whereby the first conductor and the second conductor are electrostatically attracted toward each other to cause at least a portion of the dielectric fluid to be displaced to an outer peripheral region of the fluid chamber, whereby an overall height of the one or more actuators increases.

14. The method of claim 13, wherein the portion of the vehicle seat is a bolster of a seat cushion.

15. The method of claim 13, wherein the portion of the vehicle seat is a bolster of a seat back.

16. The method of claim 13, wherein the portion of the vehicle seat is a seat back or a seat cushion.

17. The method of claim 13, wherein determining, based on the sensor data acquired by one or more sensors, whether a seat actuator activation condition is met includes:

comparing the sensor data to one or more thresholds; and if the sensor data meets the one or more thresholds, then it is determined that a seat actuator activation condition is met.

18. The method of claim 17, wherein the one or more thresholds includes a vehicle speed threshold or a steering angle threshold.

19. The method of claim 17, wherein the one or more thresholds includes a lateral acceleration threshold.

20. The method of claim 13, further including:

determining, based on the sensor data acquired by one or more sensors, whether a seat actuator deactivation condition is met; and responsive to determining that the seat actuator deactivation condition is met, causing one or more actuators to be deactivated to cause the portion of the vehicle seat to substantially return to a non-activated configuration.

* * * * *